UNITED STATES PATENT OFFICE.

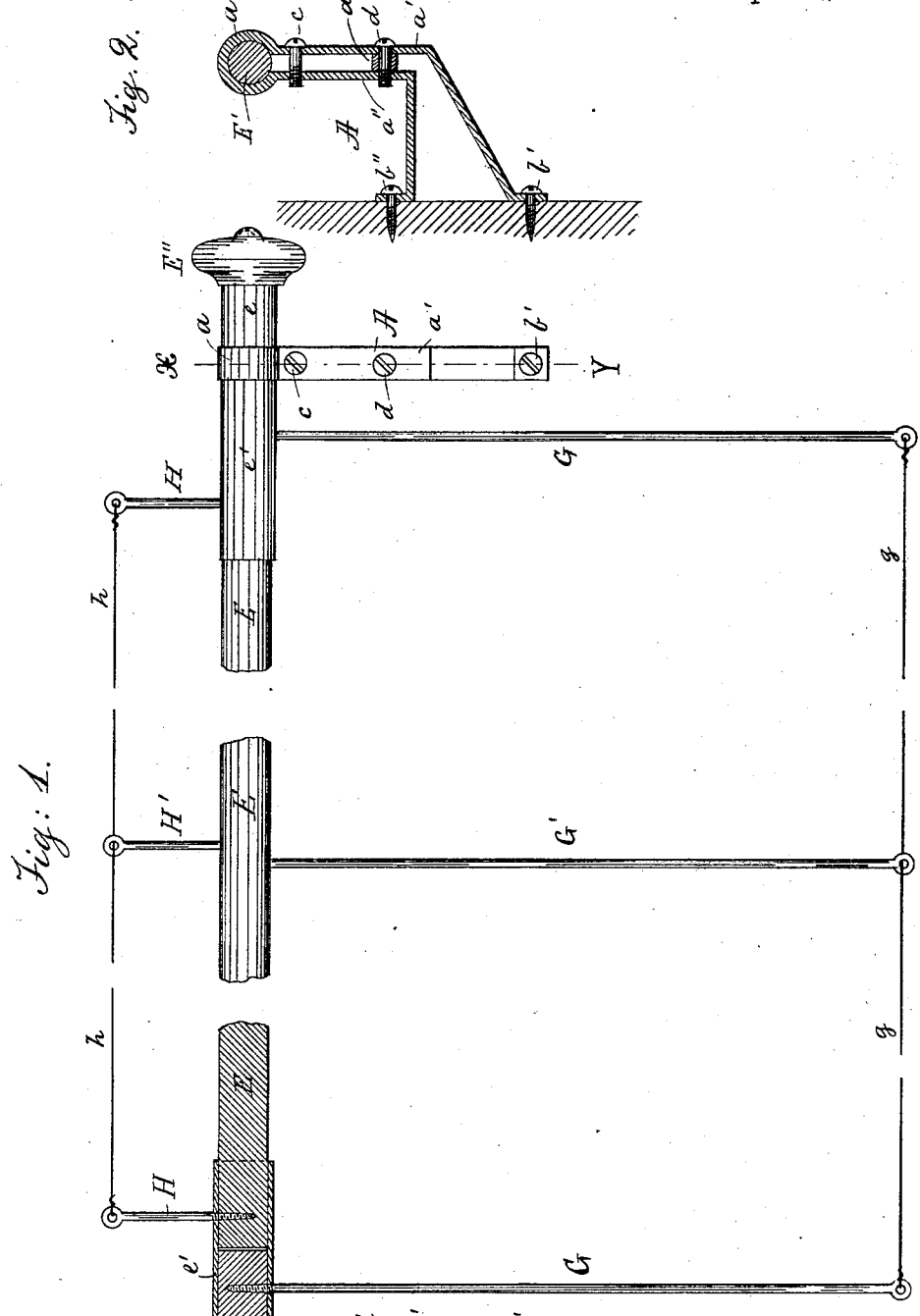

HENRY C. WARREN, OF BOSTON, MASSACHUSETTS.

PILLOW-SHAM HOLDER.

SPECIFICATION forming part of Letters Patent No. 360,633, dated April 5, 1887.

Application filed February 5, 1887. Serial No. 226,660. (No model.)

*To all whom it may concern:*

Be it known that I, HENRY C. WARREN, a citizen of the United States, and a resident of Boston, in the county of Suffolk and State of Massachusetts, have invented new and useful Improvements in Pillow-Sham Holders, of which the following, taken in connection with the accompanying drawings, is a specification.

The invention, although especially adapted as a pillow-sham holder, is equally useful as a towel-rack for the suspension of towels or similar articles, and it can also be used to advantage as a curtain-pole to hang curtains or draperies on, as will hereinafter be more fully shown and described, reference being had to the accompanying drawings, wherein—

Figure 1 represents a front elevation showing one of the bearings and a portion of the rod or pole in section. Fig. 2 represents a vertical section on the line X Y, shown in Fig. 1.

Similar letters refer to similar parts, wherever they occur, on the different parts of the drawings.

A A in Figs. 1 and 2 represent the stationary bearings for the rod or pole, each of such bearings being made of a single piece of metal, as shown in Fig. 2, having an eye, $a$, in its upper end to receive the pole or rod, and downwardly-projecting legs $a'$ and $a''$, the ends of which are perforated to receive the respective screws or nails $b'$ $b''$, by means of which the bracket is secured to the head of a bed or other object, according to the use for which it is intended.

The legs $a'$ $a''$ are arranged parallel, or nearly so, to each other at the portions nearest to the eye $a$, as shown in Fig. 2, and through such parallel parts of the legs are screwed the respective tension-regulating screw $c$ and stay screw or bolt $d$, as shown in Fig. 2, both of which pass loosely through one of the legs of the bracket and are screwed into the other leg, as shown. Surrounding the stay-bolt $d$, I locate between the parallel parts of the legs $a'$ $a''$ a tube or cylinder, $d'$, which, in connection with the stay-bolt $d$, serves to confine the legs $a'$ $a''$ rigidly together at a proper distance apart at this place, as shown.

By adjusting the set-screw $c$ the rod or pole can be firmly secured within the eye $a$ of the bracket, or so clamped within said eye $a$ as to obtain any desired frictional resistance on the rod or pole, so as to retain it in any desired position in which it may be left. As an equivalent for the stay-bolt $d$ and its tube or cylinder $d'$ may be used a rivet with an enlargement extending between the interior surfaces of the parallel parts of the legs $a'$ $a''$, and having its ends riveted to the legs $a'$ $a''$, or in any other suitable manner, it being only necessary to have a rigid connection between the legs $a'$ $a''$ at this point; but in practice I prefer to use the screw $d$ and its sleeve $d'$, as they may be detached, as well as the regulating-screw $c$, from the legs $a'$ $a''$, to permit the latter to be expanded during the insertion or removal of the pole or rod to or from the eye $a$.

The pole or rod is preferably made in three parts, as follows: the middle or main portion, E, and end portions, E' E', as shown in Fig. 1. The end portions, E' E', are supported and made to rest in the eyes $a$ $a$ of the brackets A A, as shown, and each of such end portions E' extends beyond the eye $a$, and has secured to its outer end the metal sleeve $e$ and to its inner end the metal sleeve $e'$, that projects beyond the inner end of rod portion E', as shown in Fig. 1, to receive the end of the main portion E of the rod or pole, as shown, and by this arrangement two advantages are obtained—namely, I obtain metal abutting-surfaces of the rod or pole on both sides of the eye $a$, by which the wear is materially lessened and its durability increased, and by means of the inwardly-projecting tube $e'$ the main rods E may be made of uniform length and afterward cut off, as may be desired, to fit any particular sized bed or other furniture or object without the need of making special sizes of such main portions for special purposes, by which a great saving in the manufacture of the device is obtained. To the outer end of each rod portion E', I secure a suitable knob or handle, E'', by which the rod or pole can be turned around its axis, forward and back, if the device is used for the purpose of a pillow-sham holder, and when so used I secure to the rod or pole a series of arms or eyebolts, G G G' and H H H', as shown in Fig. 1, the rods G G being screwed through perforations in the sleeves $e'$ $e'$ into the main pole or rod E, so as to secure the latter to said sleeves, and the rods H H are similarly screwed through perforations in the said ferrules or sleeves $e'$ $e'$ into the end portions, E' E', as shown in Fig. 1, so as to secure the said end portions, E' E', to the said sleeves $e'$ $e'$.

$g$ and $h$ are wires connecting the outer ends of the respective arms or eyebolts G G G' and H H H'.

What I wish to secure by Letters Patent and claim is—

1. The improved bracket, as described, consisting of a single piece of metal, A, having the eye $a$, for holding a bar or rod, and legs $a'$ $a''$, combined with the regulating-screw $c$ and stay-bolt $d$, with its sleeve or equivalent device $d'$, for clamping the rod or bar within the eye $a$, as and for the purpose set forth.

2. The brackets A A, constructed as described, with eyes $a$ $a$ in their upper ends for holding a bar or rod, and legs $a'$ $a''$, having the regulating-screw $c$ and stay-bolt $d$, for clamping the rod or bar within the eye $a$, in combination with the roller E and end pieces, E' E', and sleeves $e$ $e'$ on the latter, as and for the purpose set forth.

3. In combination, the single-piece brackets A A, having eyes $a$ $a$, for holding a bar or rod, and regulating-screws $c$ $c$ and stay-bolts $d$ $d$, for clamping the rod within the eye $a$, with the main rod E and its end pieces, E' E', the sleeves $e$ $e$ $e'$ $e'$, and rods G G G' H H H', with their respective connecting-wires $g$ $h$, for supporting the cloth or pillow-sham, as and for the purpose set forth.

In testimony whereof I have signed my name to this specification, in the presence of two subscribing witnesses, on this 3d day of February, A. D. 1887.

HENRY C. WARREN.

Witnesses:
ALBAN ANDRÉN,
HENRY CHADBOURN.